United States Patent
Cochrane et al.

(10) Patent No.: US 10,733,176 B2
(45) Date of Patent: Aug. 4, 2020

(54) DETECTING PHANTOM ITEMS IN DISTRIBUTED REPLICATED DATABASE

(71) Applicant: International Business Machines Corporation, Armonk, NY (US)

(72) Inventors: Roberta Cochrane, Mount Kisco, NY (US); Manish Sethi, New Delhi (IN); Balaji Viswanathan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 291 days.

(21) Appl. No.: 15/830,620

(22) Filed: Dec. 4, 2017

(65) Prior Publication Data

US 2019/0171739 A1    Jun. 6, 2019

(51) Int. Cl.
| | |
|---|---|
| *G06F 16/00* | (2019.01) |
| *G06F 16/23* | (2019.01) |
| *G06F 16/22* | (2019.01) |
| *G06F 16/215* | (2019.01) |
| *H04L 9/32* | (2006.01) |

(52) U.S. Cl.
CPC ........ *G06F 16/2365* (2019.01); *G06F 16/215* (2019.01); *G06F 16/2255* (2019.01); *G06F 16/2379* (2019.01); *H04L 9/3239* (2013.01); *H04L 9/321* (2013.01); *H04L 2209/38* (2013.01)

(58) Field of Classification Search
CPC .................................................. G06F 16/2365
See application file for complete search history.

(56) References Cited

U.S. PATENT DOCUMENTS

| | | |
|---|---|---|
| 5,781,910 A | 7/1998 | Gostanian et al. |
| 5,870,758 A * | 2/1999 | Bamford ............. G06F 16/2343 |
| 7,774,319 B2 | 8/2010 | Schweigkoffer et al. |
| 7,870,398 B2 | 1/2011 | Perng et al. |
| 8,838,531 B2 | 9/2014 | Bentkofsky et al. |
| 2008/0282244 A1 | 11/2008 | Wu et al. |

(Continued)

OTHER PUBLICATIONS

A. K. Elmagarmid, "A survey of distributed deadlock detection algorithms," ACM Sigmod Record 15.3 (1986): 37-45. Retrieved from Internet using: https://pdfs.semanticscholar.org/cc14/0222bdc4f7a4dd9a9c10648849f69ae7384d.pdf.

(Continued)

*Primary Examiner* — Hung Q Pham

(57) ABSTRACT

The example embodiments are directed to a system and method for detecting phantom data items in a blockchain transaction. In an example, the method includes one or more of generating a transaction data set during a read phase of a blockchain transaction, the transaction data set including an identification of each query of the transaction executed during the read phase and results of each query, generating a validation data set by re-executing each query during a validation phase of the blockchain transaction, the validation data set including query results of each respective re-executed query, determining whether the blockchain transaction observes one or more phantom data items based on the query results of the transaction data set and the validation data set, and, in response to determining the transaction observes the one or more phantom data items, preventing the transaction data set from being written to the blockchain.

21 Claims, 6 Drawing Sheets

(56) References Cited

U.S. PATENT DOCUMENTS

2016/0378881 A1* 12/2016 Agarwal ............ G06F 11/3409
                                                     707/703
2017/0295023 A1* 10/2017 Madhavan ............ H04L 9/3247
2017/0329836 A1* 11/2017 Simitsis ................ G06F 16/283

OTHER PUBLICATIONS

I. Krivokapić, A. Kemper, and E. Gudes, "Deadlock detection in distributed database systems: a new algorithm and a commparative performance analysis," The VLDB Journal—The International Journal on Very Large Data Bases 8.2 (1999): 79-100. Retrieved from Internet using: https://pdfs.semanticscholar.org/e234/9b7c3ec37e03f4a3f53c,cfe10d0267aa2376.pdf.

"Data Concurrency and Consistency," Oracle Database Online Documentation, 10g Release 2 (10.2), Chapter 13, p. 19 or 36. Retrieved from Internet using: https://docs.oracle.com/cd/B19306_01/server.102/b14220/consist.htm.

* cited by examiner

DETECTING PHANTOM ITEMS IN DISTRIBUTED REPLICATED DATABASE

TECHNICAL FIELD

This application generally relates to managing blockchain transactions, and more particularly, to a system, method, and computer readable medium which detects phantom items during blockchain transaction processing in order to achieve appropriate isolation level for the transactions.

BACKGROUND

A blockchain may be used as a public ledger (or private ledger) to store information within a database. Transactions are executed within a blockchain database when it is determined that certain conditions are satisfied. The results of the transaction mutate the information stored in the database which is replicated (i.e., distributed) across multiple blockchain nodes. Because any individual or entity can provide information to a public blockchain, this information should be reviewed and confirmed. This review operation is known as consensus. Blockchain systems typically rely on a decentralized consensus which transfers authority and trust to a decentralized network and enables its nodes (i.e., blockchain peers) to continuously and sequentially record their transactions on a public "block", creating a unique "chain" referred to as a blockchain. Cryptography, via hash codes, is used with a blockchain to secure an authentication of a transaction source and removes the need for a central intermediary.

A blockchain transaction relies on optimistic concurrency control for processing a blockchain transaction. The process typically has three phases including a read phase in which data is collected from the database and written to a private workspace, a validation phase in which the read data is checked for conflict with other transactions, and a write phase in which the data written to the private workspace is committed to the blockchain after a successful validation. However, in a distributed database such as blockchain, there is a delay between when a transaction performs a read phase to when the read/modified data is committed to the database for public view. As a result, new data items are often added or removed from the database after data has been read for transaction processing but prior to the processed data committed to the blockchain database. This delay can give rise to phantom reads/phantom items which result in data items being added and/or deleted from the database by other transactions while a first transaction is being processed between the read phase and the commit process. Phantom items create inconsistencies and inaccuracies within the blockchain database leading to errors and other faulty conditions.

SUMMARY

In one example embodiment, provided is a method that includes one or more of generating a transaction data set during a read phase of a blockchain transaction, the transaction data set comprising an identification of each query of the blockchain transaction executed during the read phase and query results of each respective query, generating a validation data set by re-executing each query during a validation phase of the blockchain transaction, the validation data set comprising query results of each respective re-executed query, determining whether the blockchain transaction observes one or more phantom data items based on the query results of the transaction data set and the validation data set, and in response to determining the transaction observes the one or more phantom data items, preventing the transaction data set from being written to the blockchain.

In another example embodiment, provided is a computing system that includes a memory storing program instructions, and a processor configured to execute the program instructions stored in the memory. In this example, the executed program instructions may cause the processor to one or more of generate a transaction data set during a read phase of a blockchain transaction, the transaction data set comprising an identification of each query of the blockchain transaction executed during the read phase and query results of each respective query, generate a validation data set by re-executing each query during a validation phase of the blockchain transaction, the validation data set comprising query results of each respective re-executed query, determine whether the blockchain transaction observes one or more phantom data items based on the query results of the transaction data set and the validation data set, and in response to determining the transaction observes the one or more phantom data items, preventing the transaction data set from being written to the blockchain.

In another example embodiment, provided is a non-transitory computer readable medium having stored therein program instructions that when executed cause a computer to perform one or more generating a transaction data set during a read phase of a blockchain transaction, the transaction data set comprising an identification of each query of the blockchain transaction executed during the read phase and query results of each respective query, generating a validation data set by re-executing each query during a validation phase of the blockchain transaction, the validation data set comprising query results of each respective re-executed query, determining whether the blockchain transaction observes one or more phantom data items based on the query results of the transaction data set and the validation data set, and in response to determining the transaction observes the one or more phantom data items, preventing the transaction data set from being written to the blockchain.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

Figure 1:
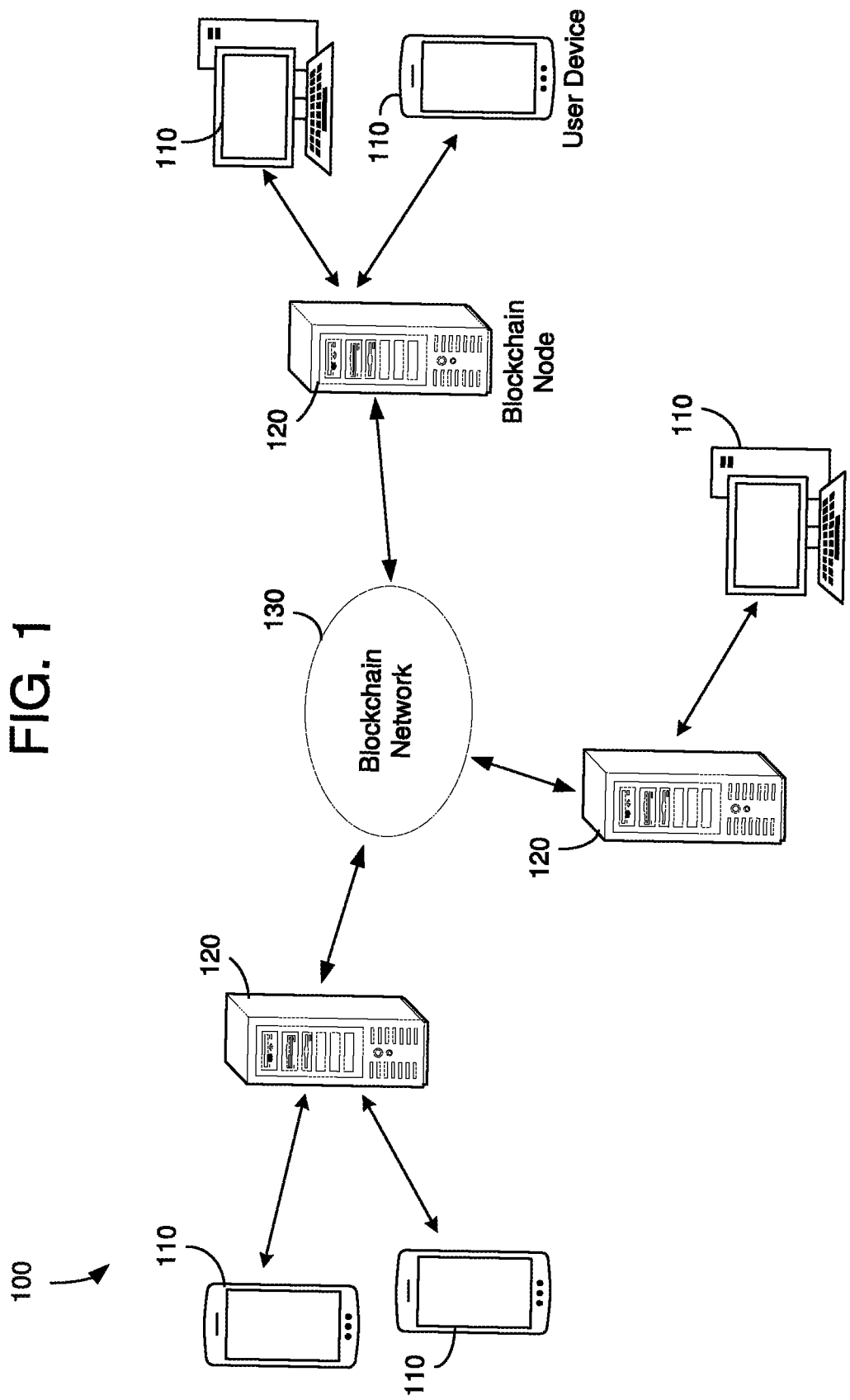
FIG. 1 is a diagram illustrating a blockchain system in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application relates to blockchain transactions, and in particular, to a system and software program that manages blockchain transactions during a read phase, a validation phase, and a write phase, and prevents phantom items from being stored in the blockchain database. A blockchain is typically distributed across a plurality of blockchain nodes which participate in the same blockchain network. When a transaction is executed and committed to the blockchain by a first blockchain node, the transaction is also replicated across the other blockchain nodes in the network to ensure a consensus of the transactional data across all nodes in the distributed network of peers.

Transactions are typically requested and executed by one or more smart contracts (i.e., chaincode) executing on a blockchain node. A transaction includes a sequence of read and write operations performed on the underlying database, which in the case of blockchain is a distributed ledger. The underlying database executes/performs the transaction in three execution phases (i.e., read, validate, and write). The performance of the three phases of the transaction are typically transparent to the smart contract or application code that is executing the transaction. In a distributed database such as blockchain, there is a delay between when database executes the read phase to when the resulting data is committed to the underlying database during the write phase (e.g., making the data publicly available). During this delay, other concurrent transactions can execute causing conflicts in the data items read by the database during the read phase.

For purposes of example, the phases of the blockchain transaction may be defined as follows. During the read phase, a transaction (sequence of operations) reads (i.e., queries) all the data it requires from the underlying database. In addition, write operations included in the read phase may modify the read data and store the modified data in a transaction specific private workspace (temporary) which does not yet change the database. Subsequently, at the time of commit of the transaction (i.e., storing the transaction to the database), the database validates that there are no conflicts with other transactions (e.g., due to delay between read and write phases). If there are no conflicts, then the transaction proceeds to write phase, otherwise the transaction is aborted. On successful validation, the transaction's changes (updates stored in private workspace until now) are written to the database during the write phase and are available for future transactions/queries, etc. The private workspace may be a per transaction store. Concurrently executing transactions cannot see the updates/writes of each-other as all their writes will go into their private store. The private workspace can be seen as an in-memory data-structure which is used to capture the write-set of the transaction.

However, as mentioned there is a delay between when the read phase is performed by the database and the database is queried for transaction data processing, and when the processed data is committed to the database. This delay creates phantom data items that can occur when a data item associated with the read phase of a transaction is subsequently modified, added, deleted, etc., by another concurrent transaction resulting in the read data being out of date. In order to address this issue, the example embodiments generate a transactional data set (e.g., read-write data set) during a read phase which includes an identification of each query and a hashed result set of each query. The pairs of queries and hashed result sets may be stored as tuples in the transactional data set. Furthermore, during the validation phase of the transaction, the database re-executes the queries and hashes the results to generate a validation set. The database then compares the transaction data set with the validation set to determine if any phantom data items are present. If a phantom data item is observed, then the transaction can be prevented from being committed to the blockchain database.

FIG. 1 illustrates a blockchain system 100 in accordance with an example embodiment. Referring to FIG. 1, the system 100 includes a distributed group of blockchain nodes 120 (also referred to as peers) which may communicate with one another and store a replica of a blockchain which is subject to consensus among the blockchain nodes 120. According to various embodiments, the blockchain may be used to execute and record transactions that are associated with any desired industry such as goods and services, financial, healthcare, and the like. Each transaction recorded may include a unique blockchain ID, an identification of the parties involved, and the like. The system 100 also includes a network 130 connecting the blockchain nodes 120 (e.g., a peer-to-peer network, etc.) which connect the nodes 120 via the Internet, a private network, and the like. Furthermore, user devices 110 (e.g., computers, tablets, mobile devices, POS terminals, and the like) may communicate with the blockchain nodes 120 via a network such as the Internet, a private network, or the like, and provide transaction information to the blockchain.

When a transaction is initiated by one of the user devices 110 via a blockchain node 120, the blockchain node may execute the three phases of the transaction including the read phase, the validation phase, and the write phase. When the three execution phases are successful the transaction data is stored in the blockchain, a copy of which is recorded by each of the blockchain nodes 120 in the system 100. Furthermore, each transaction that modifies the blockchain may be replicated across the other blockchain nodes 120 to ensure consensus among the blockchain nodes in the blockchain system 100.

Figure 2:
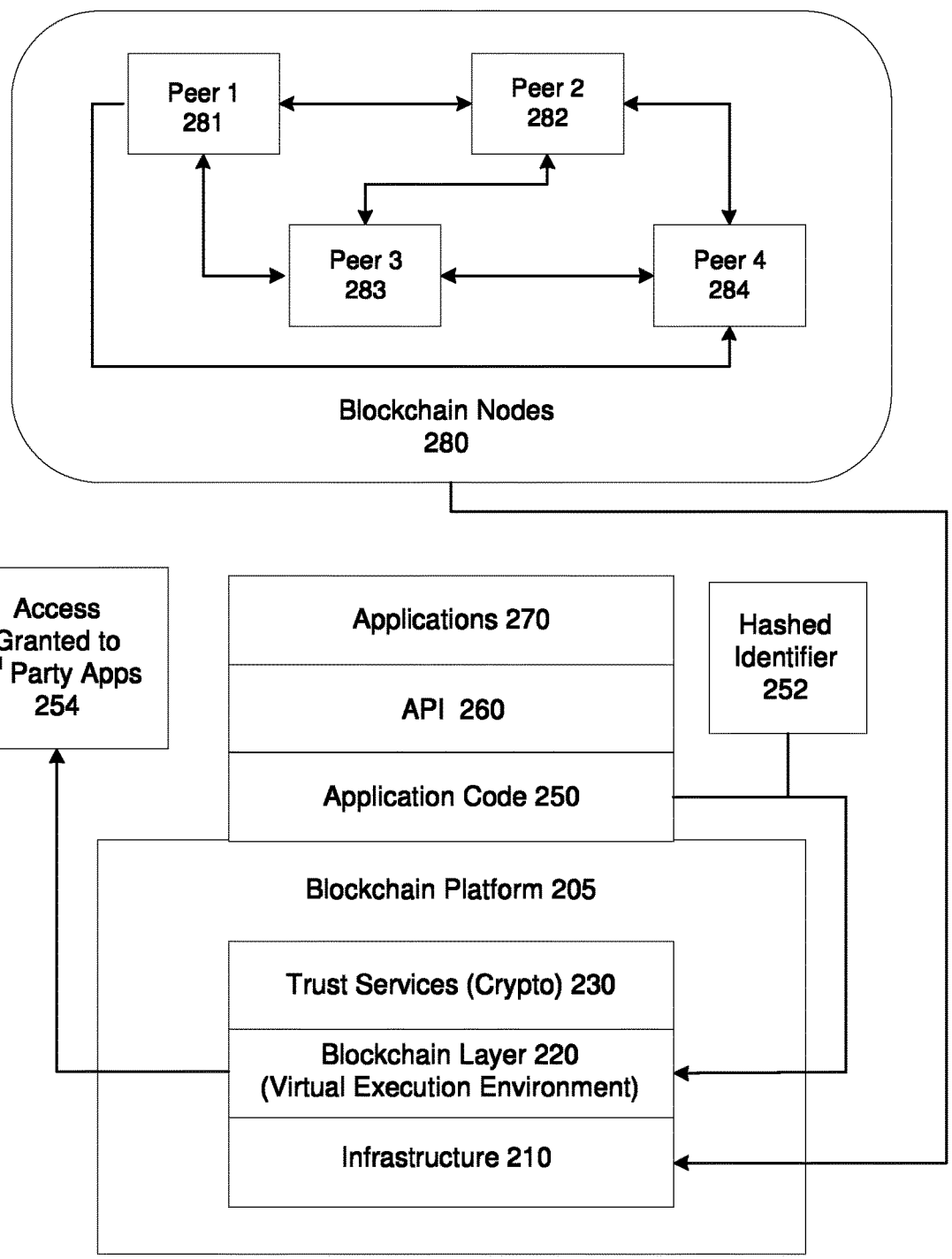
FIG. 2 is a diagram illustrating a blockchain computing system configuration in accordance with an example embodiment.

FIG. 2 illustrates a blockchain system database configuration, according to example embodiments. Referring to FIG. 2, blockchain database system 200 may include certain common blockchain elements, for example, a group 280 of assigned peer blockchain nodes 281-284 which participate in blockchain transaction addition and validation process (consensus). As an example, the blockchain nodes 120 shown in FIG. 1 may be the peer blockchain nodes 281-284, etc. Any of the blockchain peer nodes 280 may initiate a blockchain transaction and seek to write to a blockchain immutable ledger stored in blockchain layer 220, a copy of which may also be stored on the underpinning physical infrastructure 210. In this configuration, the customized blockchain configuration may include one or applications 270 which are linked to application programming interfaces (APIs) 260 to access and execute stored program/application code (e.g., chain code and/or smart contracts) 250, which are created according to the customized configuration sought by the participants and can maintain their own state, control its own assets, and receive external information. This code can be deployed as a transaction and installed, via appending to the distributed ledger, on all blockchain peer nodes 280.

The blockchain base or platform 205 may include various layers of blockchain data, services (e.g., cryptographic trust services, virtual execution environment, etc.), and underpinning physical computer infrastructure necessary to receive and store new transactions and provide access to auditors which are seeking to access data entries. The blockchain layer 220 may expose an interface that provides access to the virtual execution environment necessary to process the application program code 250 and engage the physical infrastructure 210. Cryptographic trust services 230 may be used to verify transactions such as asset exchange transactions and keep information private.

The blockchain database system configuration of FIG. 2 may process and execute program application code 250 by way of one or more interfaces exposed, and services provided, by blockchain platform 205. The code may control blockchain assets. For example, the code can store and transfer data, and may be executed by the blockchain in the form of a smart contract and associated chain code with conditions or other code elements subject to its execution. The smart contracts 250 may be created to execute transactions, reminders, updates, and/or other notifications subject to the changes, updates, etc. The smart contracts can themselves be used to identify rules associated with authorization and access requirements and usage. For example, hashed identifier information 252 received from a user device may be processed by one or more processing entities (virtual machines) included in the blockchain layer 220. The result may include access being granted 254 to a third party application from the blockchain computing environment (VM). In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device (e.g., user device 110) submitted operation, a broker agent or the like. As described herein, a smart contract is executable code which is registered, stored, and/or replicated with a blockchain (e.g., distributed network of blockchain peers). A transaction is an execution of the smart contract code which can be performed in response to conditions associated with the smart contract being satisfied. The executing of the chaincode of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

As a result of the transaction being processed, the database may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

When a transaction is processed, one or more queries are performed during the read phase of the transaction. As described herein, queries are read operations. Furthermore, depending on the language and richness supported by database, different types of queries can be supported. For example, blockchain hyperledger fabric supports multiple types of queries including single key lookup (e.g., read X, where X is the key), range queries (e.g., read from A to Z, where A and Z are keys), rich queries (e.g., read all items where item.price>100) which can be akin to a complex SQL query, and the like. Apart from the single key lookup type query, most other query types have a phantom read issue because the exact results (both the number of results and the values of the results) which the query returns might change with time.

Figure 3:
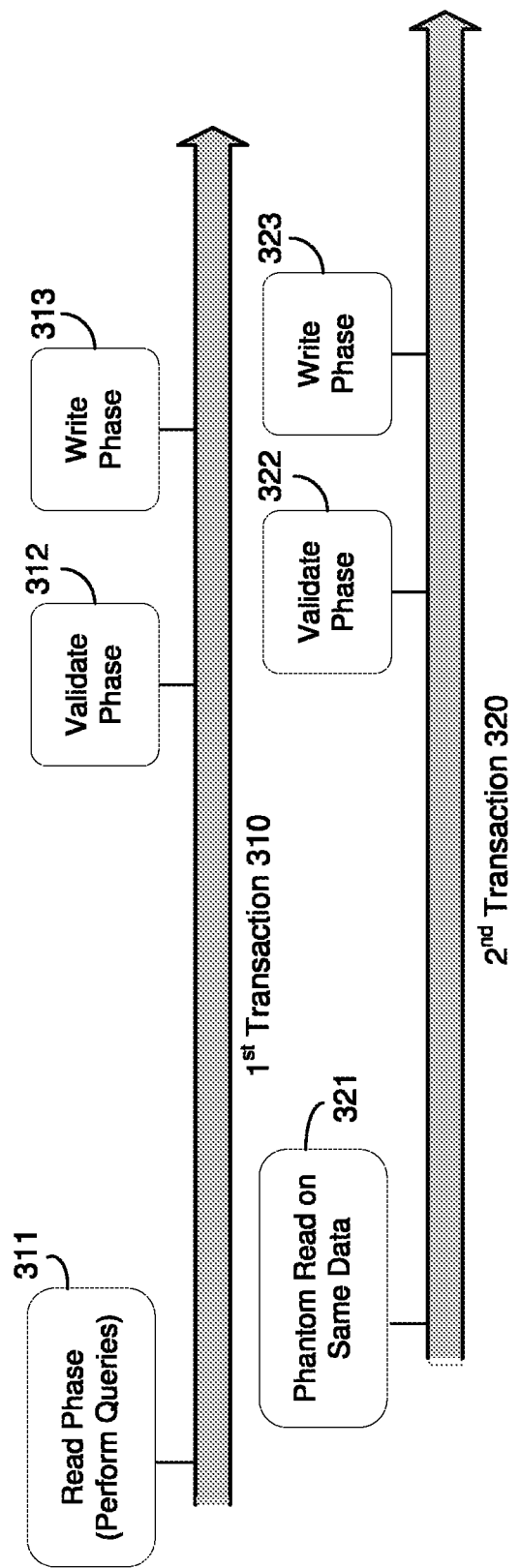
FIG. 3 is a diagram illustrating a process of a phantom item being generated in a blockchain transaction in accordance with an example embodiment.

FIG. 3 illustrates a process 300 of a phantom item being generated in a blockchain transaction in accordance with an example embodiment. As will be appreciated, two transactions may be executed serially such that one transaction completes all of its execution phases (read, validate, and write) before the other transaction begins any of the phases. However, when two transactions execute concurrently a phantom read may occur which can create phantom data items. In this example, two transactions (i.e., transaction 310 and transaction 320) are executed concurrently. That is, both transactions 310 and 320 begin the read phase 311 and 321, respectively, of on the same data from a database before the results of either of the transactions 310 or 320 are written to the database in 313 and 323, respectively. As a result, a phantom data item is created.

As a non-limiting example, transaction 310 and transaction 320 are listed below:
a. Transaction 310—Get all items which are blue in color and change them to red.
  i. start transaction 311
  ii. rich query—select all items where item.color='red'
  iii. iterate through items and change color to blue—for each selected item, set item.color='blue'
  iv. validate transaction 312
  v. commit transaction 313
b. Transaction 320—Insert a new item with red color
  i. start transaction 321
  ii. insert new item with color='red'
  iii. validate transaction 322
  iv. commit transaction 323

In this example, both transactions 310 and 320 access the same data from the database (i.e., red color items). For purposes of example, assume there are 100 red items in the database initially. If transaction 310 and transaction 320 execute concurrently, then, transaction 310 could see either 100 'red' items or 101 'red' items depending on whether transaction 320 commits before transaction 310 reads. In this example, the first transaction 310 may perform a validation 312 and a commit/write 313 and the second transaction 320 may perform a validation 322 before the first transaction 310 has committed the first transaction data in 313. Furthermore, when the second transaction 320 performs the write/comment in 323, the first transaction and the second transaction 320 result in different data being created and written causing a phantom item. All databases have phantom item issues, but they handle it differently, for example, using locks or the like. In a distributed database like hyperledger fabric of the blockchain, the validation of the data needs to be done during commit phase.

Figure 4:
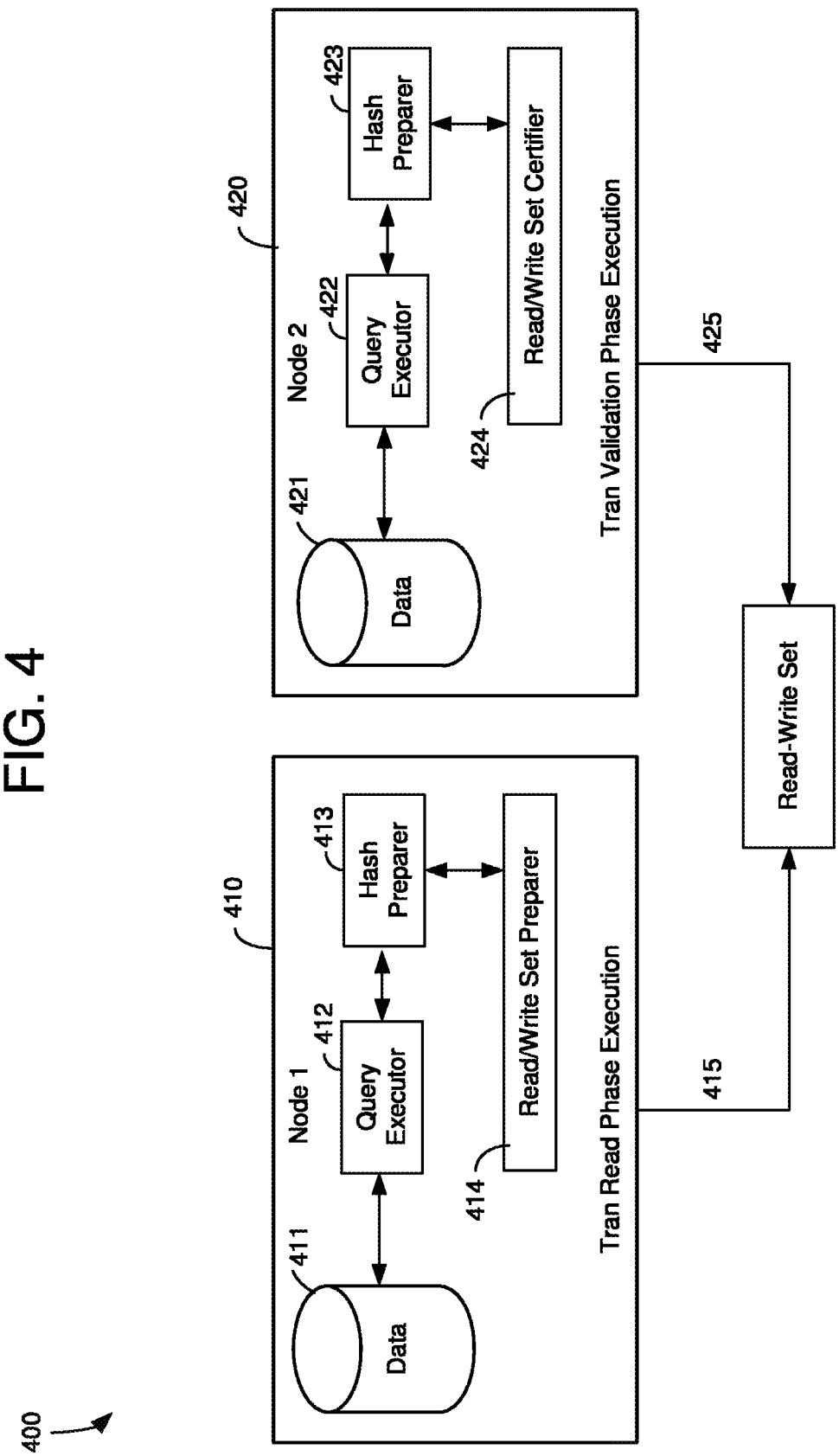
FIG. 4 is a diagram illustrating a process of a blockchain node detecting a phantom item being generated in accordance with an example embodiment.

FIG. 4 illustrates a process 400 of a blockchain node detecting a phantom item in accordance with an example embodiment. In this example, a first node 410 performs a transaction read phase execution and a second node 420 performs a validation phase execution of a same transaction. Both nodes 410 and 420 include a database 411 and 421, a query executor 412 and 422, and a hash preparer 413 and 423, respectively. Furthermore, the first node 410 generating the initial read/write transactional data set includes a preparer 414 for preparing the transaction data set 415 including tuples<query, hashed query results>. Meanwhile, the second node 420 includes a certifier 424 that is capable of generating a validation data 425 including hashed query results and comparing the validation data set with the hashed query results of the transaction data set generated by the preparer 414. If the sets of data 415 and 425 match, the database writes the transaction to the blockchain database. However, if the sets of data 415 and 425 do not match, a phantom data item is observed, and the database prevents the transaction from being written to the database.

In this example, during the read phase, the executing/simulating of the transaction by the query executor 412 of the first node 410 executes one or more queries which are processed by the blockchain. The results of each query during the read phase are hashed by the hash preparer 413 and stored by the preparer 414 as transaction data 415 which may include separate tuples with a query/hash result for each query. Furthermore, writes (or updates) are also executed by the transaction, but they are stored in private workspace and does not change the database immediately.

Meanwhile, during validation phase the queries are executed again by the query executor 422 of the second node 420 to validate that the results of the queries are the same as in the read phase. The hash preparer 423 hashes the results of the queries and the certifier 424 stores the hash results as validation data 425. Every transaction which needs to be committed will go through the validation phase. The database will trigger the validation phase and only commit the transaction if the validation succeeds. The database (in this case the hyperledger fabric code running on the blockchain node) compares the results. When the query results are the same in both the read phase and validation phase, the write phase is conducted and the transaction is stored on the blockchain. However, when the hashed query results from the transaction data set of the read phase and the hashed query results of the validate data set of the validation phase do not match, the database determines a phantom data item is present in the validation data set and may prevent the write phase from occurring. For example, the database may abort the transaction altogether. As another example, the database may restart the read phase again against a refreshed database. The determination made by database may be based on an "isolation level" at which a transaction is operating at. In a strict case such as a serializable isolation level, the transaction may be aborted by the database (fabric) or under some configurations, the transaction could be retried automatically or at application control (in which case it has to go through read/validate/write again). Serializable is typically the isolation level of the hyperledger fabric.

Figure 5:
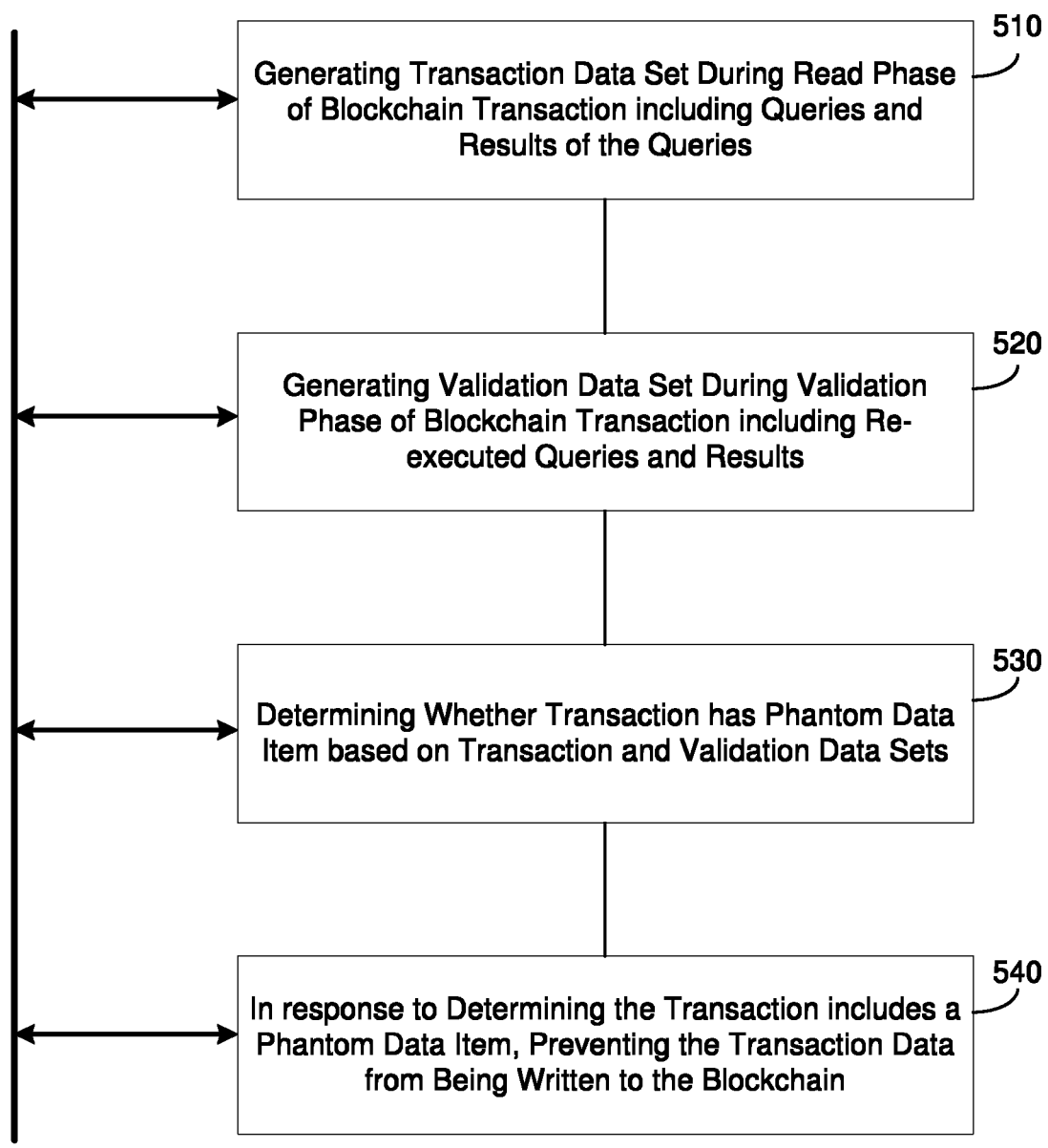
FIG. 5 is a diagram illustrating a method for detecting phantom items in accordance with an example embodiment.

FIG. 5 illustrates a method 500 for detecting phantom items in accordance with an example embodiment. For example, the method 500 may be performed by a blockchain node 120 shown in FIG. 1 which may include a database device such as a server, a cloud platform, a workstation, and the like. In 510, the method includes generating a transaction data set during a read phase of a blockchain transaction. For example, the transaction data set may be a read-write data set. The transaction data set may include an identification of each query of the blockchain transaction executed during the read phase and query results of each respective query. For example, the transaction may include a single query or a plurality of queries which are executed against a database.

According to various embodiments, the transaction data set may include a hashed query result set for each query which may be stored as tuples in the transaction data set. In this example, each tuple may include an identification of a respective query and the hashed results of the respective query. Here, the hashed query result may be generated based on a hash function determined by the blockchain node. In some embodiments, prior to generating the transaction data, the method may further include identifying or otherwise collecting queries performed by the transaction during the read phase and collecting the results of the queries. The queries may include read operations performed on a database of the blockchain node. For example, queries may include a range query, a rich query, and the like.

In 520, the method includes generating a validation data set by re-executing each query during a validation phase of the blockchain transaction, the validation data set comprising query results of each respective re-executed query. For example, the validation data set may include the query results being hashed using the same hash function used during the read phase. The validation data set may also include a read-write data set. Prior to executing the validation phase, the transaction data set generated during the read phase may be stored in a private workspace of the blockchain node. Furthermore, the read phase and the validation phase may be executed by the same blockchain node. In other embodiments, the validation phase may be executed by a different node (e.g., that cannot access the private workspace) of the node that took place in the read phase thus creating an additional layer of security.

In 530, the method includes determining whether the blockchain transaction observes one or more phantom data items based on the query results of the transaction data set and the validation data set, and in response to determining the transaction includes one or more phantom data items, in 540 the method includes preventing the transaction data set from being written to the blockchain. For example, the phantom data item may be detected by comparing the transaction data set and the validation data set. If the two data sets do not match it may be determined that one or more phantom data items are present in the validation data set. Accordingly, the transaction can be prevented from entering the third phase of the transaction execution process. In some embodiments, the method may further include automatically executing the read phase and the validation phase again using refreshed data queries in response to the transaction observing the phantom data item.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
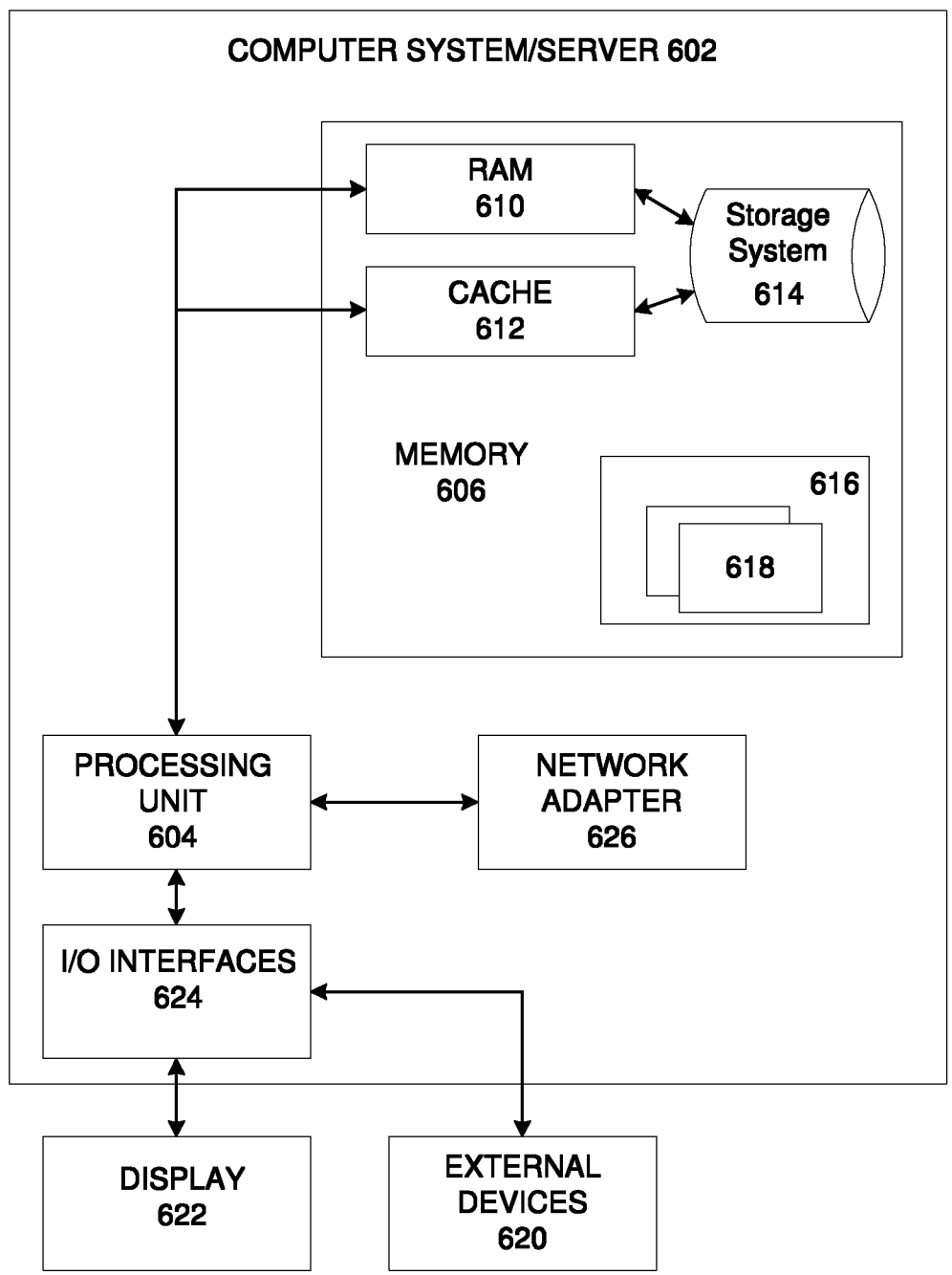
FIG. 6 is a diagram illustrating a blockchain computing system for detecting phantom items in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc. The computer system 600 may be a single device or a combination of devices. For example, the computer system 600 may be a blockchain node, a database, a server, a cloud platform, a network, a combination thereof, and the like.

FIG. 6 is not intended to suggest any limitation as to the scope of use or functionality of embodiments of the application described herein. Regardless, the computing system 600 (or node 600) is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in computing node 600 is shown in the form of a general-purpose computing device. The components of computer system/server 602 may include, but are not limited to, one or more processors or processing units 604 (i.e., processors), a system memory 606, and a bus that couples various system components including system memory 606 to processor 604. The computing node 600 may be the blockchain node 120 shown in FIG. 1 or another device or combination of devices such as a server, cloud platform, database, and/or the like. Also, the computing node 600 may perform the method 500 shown in FIG. 5. For example, the system memory 606 may store instructions which when executed by the processor 604 cause the processor to execute the steps of the method 500 shown in FIG. 5.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626 (also referred to as a network interface). As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A blockchain transaction processing method, comprising:
   generating a transaction data set during a read phase of a blockchain transaction, the transaction data set comprising an identification of a query of the blockchain transaction and a first instance of a write set generated by executing the query during the read phase and stored in a private workspace without being committed to a blockchain;
   generating a validation data set by re-executing the query during a validation phase of the blockchain transaction, the validation data set comprising a second instance of the write set generated by re-executing the query;
   determining whether the blockchain transaction observes one or more phantom data items based on whether the first instance of the write set included in the transaction data set and the second instance of the write set included in the validation data set are a match; and
   in response to determining the blockchain transaction observes the one or more phantom data items, preventing the transaction data set from being written to the blockchain.

2. The blockchain transaction processing method of claim 1, wherein the generating the transaction data set during the read phase comprises generating a hashed query result set for the query and storing an identification of the query and its respective hashed query result set as a tuple in the transaction data set.

3. The blockchain transaction processing method of claim 2, wherein the generating the validation data set during the validation phase comprises generating a hashed result for the re-executed query.

4. The blockchain transaction processing method of claim 1, wherein the read phase is executed by a first node and the validation phase is executed by a second node that did not participate in the read phase.

5. The blockchain transaction processing method of claim 1, further comprising detecting the query issued by the blockchain transaction during the read phase.

6. The blockchain transaction processing method of claim 1, further comprising storing the transaction data set in the private workspace while executing the validation phase of the blockchain transaction.

7. The blockchain transaction processing method of claim 1, further comprising automatically executing the read phase and the validation phase again in response to determining that the transaction observes the one or more phantom data items.

8. The blockchain transaction processing method of claim 1, wherein the query included in the blockchain transaction comprises a read operation performed on a database.

9. The blockchain transaction processing method of claim 8, wherein the read operation comprises one or more of a range query and a rich query.

10. A computing system comprising:
    a memory storing program instructions; and
    a processor configured to execute the program instructions stored in the memory, wherein the executed program instructions are configured to cause the processor to:
    generate a transaction data set during a read phase of a blockchain transaction, the transaction data set comprising an identification of a query of the blockchain transaction and a first instance of a write set generated by executing the query during the read phase and stored in a private workspace without being committed to a blockchain;
    generate a validation data set by re-executing the query during a validation phase of the blockchain transaction, the validation data set comprising a second instance of the write-set generated by re-executing the query;
    determine whether the blockchain transaction observes one or more phantom data items based on whether the first instance of the write set included in the transaction data set and the second instance of the write set included in the validation data set are a match; and
    in response to determining the blockchain transaction observes the one or more phantom data items, preventing the transaction data set from being written to the blockchain.

11. The computing system of claim 10, wherein the processor generates the transaction data set during the read phase by generating a hashed query result set for the query and storing an identification of the query and its respective hashed query result set as a tuple in the transaction data set.

12. The computing system of claim 11, wherein the processor generates the validation data set during the validation phase by generating a hashed result for the re-executed query.

13. The computing system of claim 10, wherein the read phase is executed by a first node and the validation phase is executed by a second node that did not participate in the read phase.

14. The computing system of claim 10, wherein the processor is further configured to detect the query issued by the blockchain transaction during the read phase.

15. The computing system of claim 10, further comprising a private workspace configured to store the transaction data set while the processor executes the validation phase of the blockchain transaction.

16. The computing system of claim 10, wherein the processor is further configured to automatically execute the read phase and the validation phase again in response to determining that the transaction observes the one or more phantom data items.

17. The computing system of claim 10, wherein the query included in the blockchain transaction comprises a read operation performed on a database.

18. The blockchain transaction processing method of claim 8, wherein the read operation comprises one or more of a range query and a rich query.

19. A non-transitory computer readable medium having stored therein program instructions that when executed cause a computer to perform a method comprising:
    generating a transaction data set during a read phase of a blockchain transaction, the transaction data set comprising an identification of a query of the blockchain transaction and a first instance of a write set generated by executing the query during the read phase and stored in a private workspace without being committed to a blockchain;
    generating a validation data set by re-executing the query during a validation phase of the blockchain transaction, the validation data set comprising a second instance of the write set generated by re-executing the query;
    determining whether the blockchain transaction observes one or more phantom data items based on whether the first instance of the write set included in the transaction data set and the second instance of the write set included in the validation data set are a match; and in response to determining the blockchain transaction includes the one or more phantom data items, preventing the transaction data set from being written to the blockchain.

20. The non-transitory computer readable medium of claim 19, wherein the generating the transaction data set during the read phase comprises generating a hashed query result set for the query and storing an identification of the query and its respective hashed query result set as a tuple in the transaction data set.

21. The blockchain transaction processing method of claim 1, wherein the first and second instances of the write set include updated values to key-value pairs to be written to the blockchain which are created by the blockchain transaction.

* * * * *